United States Patent Office 2,854,348

Patented Sept. 30, 1958

2,854,348

METHOD OF PREPARING TRI-COLOR FLUORESCENT SCREENS

Edwin R. Bowerman, Whitestone, N. Y., assignor to Sylvania Electric Products Inc., a corporation of Massachusetts No Drawing. Application August 16, 1954 Serial No. 450,237

5 Claims. (Cl. 117—13)

The present invention relates to a method of preparing cathode ray screens, and in particular to a printing process for applying several phosphors in discrete patterns and in a required orientation on a surface in the manufacture of cathode ray screens. Advantageously, in accordance with the present invention, tri-color fluorescent screens may be fabricated including symmetrically placed dots or lines of appropriate phosphors.

Among the suggested cathode ray screens for all-electronic color television tubes are those which consist of a group of symmetrically placed lines or dots of phosphors on a glass screen serving as a support. One line-pattern screen design includes lines of appropraite fluorescent powder, each of a width approximately equal to .008 inch and of a length corresponding to the horizontal scan width of the television system. The spaced apart lines, each of a thickness sufficient to obtain the desired brightness, are arranged in a series of three including one each of the primary colors.

A suggested dot-pattern screen design consists of an array of some 600,000 dots of phosphor on a 15" x 20" screen arranged in clusters of three dots including one of each of the primary colors. With such dot array, a masking plate is employed containing some 200,000 holes which are spaced apart at a distance of the order of .0230 inch. The masking plate, in the form of a thin perforated metal sheet, is placed a short distance from the phosphor screen and in critical alignment with the dot clusters on the screen.

The problems encountered in fabricating such line or dot pattern arrays are numerous in that three discrete groups of patterns must be applied in close proximity to each other and in a required critical orientation with respect to each other. The problem is further magnified in that the dot size or width is of an exceptionally small dimension making dimensional tolerances critical.

In addition to the requirement for accurate orientation of respective dot or line arrays and precise dimensional control over the screen-forming components, it is important that the screen fabricating technique be compatible with economic considerations, making commercial adaptation possible. Among the requirements for mass production manufacture is that the process result in extreme uniformity from screen to screen, and be carried out without the need for extremely rigid controls and highly critical techniques. Additionally, in the formation of a screen for a cathode ray tube, consideration must be given to whether or not the processing steps deleteriously affect the screen properties and/or operation of the cathode ray tube.

It is an object of the present invention to provide an improved method for sequentially laying down phosphors in discrete patterns as determined by television picture tube design. Specifically, it is within the contemplation of the present invention to provide a process facilitating the preparation of tri-color fluorescent screens for use in cathode ray tubes, particularly those having a line array with one line for each of the primary colors.

In accordance with an illustrative process demonstrating features of the present invention, a screen-forming member, such as a flat glass plate is cleaned, prepared and dried by well understood preliminary techniques. Thereupon, the screen forming member is printed in designated areas and in a predetermined pattern with a heat-gasifiable tacky substance. The printed surface is then dusted with a phosphor powder and the powder residuals are removed. The printing, dusting and removing steps are repeated several times and in designated areas, such that a particular screen pattern is built up on the screen-forming member.

The heat-gasifiable tacky substance used is appropriate for printing on glass and is sufficiently tacky such that the phosphor powders will adhere, especially when its surface is brushed as in the removal of residue portions of a given phosphor. Additionally, the printing medium or ink is one which does not effect the final properties of the tube and/or is removable, as by heat treatment. Oil of cedar has been found to be suitable in that it can be printed onto the glass plate with rubber type in a manner familiar to the printing art. A uniform distribution of oil at a proper thickness is provided for printing which exhibits the desired binding properties for the phosphor powder sufficient to permit sequential cleaning and redusting. Further, the oil of cedar is removable or gasifiable upon heat treatment in accordance with conventional practices employed in the manufacture of cathode ray picture tubes. Other organic or inorganic substances such as sodium silicate solution, glycerin, stamp pad ink, and pigmentless printing ink vehicle have been found to be suitable for transfer of a given pattern to a glass support.

As applied to the formation of tri-color fluorescent screens for color picture tubes employing lined patterns, the above method is of exceptional merit, prominently because of its simplicity and its compatibility with conventional printing techniques.

Specifically, a line-array color screen includes a flat support, generally of glass, having lines of phosphor powder of approximately .008 inch width, a length corresponding to horizontal scan width, and a thickness usual to screens of television picture tubes. The lines are arranged in repetitions of the primary colors, for example red, green, blue, red, green, blue, etc. The screen-forming member, usually separate from and in confronting relation to the screen face of the tube, and forwardly of a conventional line masking plate is printed with a first tacky pattern on first designated areas. The surface of the screen-forming member is then dusted with a first phosphor powder, for example zinc silicate, suitable for the deposition of the required green lines of the line pattern. The excess portions of the first phosphor are removed, as by brushing or inversion of the screen. Practical experience indicates that the adhesion of the phosphor powder to the tacky carrier of the pattern, prominently oil of cedar, is sufficient to allow the parts of the glass support which have been coated with tacky material to be brushed clean of phosphor residues.

The surface of the screen-forming member is then printed with a second tacky pattern in designated areas and in a particular register to the first printed pattern. The precise orientation of the patterns may be obtained by conventional printing devices, such as are used in multicolor work and accordingly illustration herein is unnecessary. The screen formed with the second tacky pattern is dusted with a second phosphor, such as zinc sulfide, appropriate to form blue lines on the screen-forming member. The time between steps is not overly critical, but should be such that the tacky material does not distribute itself over the powder particles of the first phosphor. These subsequent dustings will not have a tendency to adhere to the first powders and contaminate the color purity. After dusting with the blue phosphor powder, the surface is again cleaned to remove excesses of the second dusting.

Thereupon, still further designated areas of the surface of the screen-forming member are printed with a third tacky pattern in required orientation to the previously formed first and second line patterns. Thereupon, the printed surface is dusted with a third phosphor powder, such as zinc cadmium sulfide, appropriate to form the required red lines of the screen. Upon removal of the residual quantity of the third phosphor powder, phosphor deposition is completed. Preferably, the phosphor should be deposited in the sequence described, in that zinc silicate is the most efficient phosphor and is least likely to be effected by subsequent dusting and cleaning incident to application of the blue and red phosphors.

After the sequential printing, dusting and cleaning steps are completed in preparing the desired tri-color pattern, the screen-forming member is baked in a furnace for a period of approximately twenty minutes and at a temperature of the order of 375° C. Such baking, conventional in the manufacture of cathode ray tubes, volatizes or gasifies the tacky substances of the printed patterns, leaving only the respective phosphors in the desired pattern on the screen-forming member.

The phosphors are held in place by surface forces which may be supplemented by coating or spraying the formed screen with a protective layer of potassium silicate. The protective layer of potassium silicate is found to impart additional ruggedness to the construction, yet does not interfere with normal operation of the cathode ray tube or create contamination therein.

The above detailed tri-color process for forming lined arrays is equally applicable to the formation of tri-color dot patterns in which clusters of three dots of phosphor, one for each of the primary colors are formed at various locations of a screen.

The foregoing methods of preparing color television screens contrast markedly to general printing techniques in that the printing material or substance is removed upon completion of the screen. For example, printing with an ink prepared from appropriate phosphor powders and a suitable binder would be difficult due to the extreme problems encountered in obtaining uniform inking, as well as contact and transfer of the ink to the glass support of the screen. Additionally, the formulation of printing ink using pigments of critical particle size and distribution would be necessary to obtain the requisite uniformity in patterns.

A latitude of substitution in the foregoing illustrative processes of the present invention will occur to those skilled in the art, and accordingly the claims should be accorded such a broad interpretation as is commensurate and consistent with the spirit and scope of the present invention.

What I claim is:

1. The method of preparing a tri-color fluorescent screen suitable for use in a cathode ray tube including the steps of printing a first tacky pattern on first designated areas of a surface on which a screen is to be applied, dusting said surface with a first phosphor powder, removing residual quantities of said first phosphor powder which does not adhere to said first tacky pattern, printing a second tacky pattern before the first tacky pattern has become dry, on second designated areas of said surface, dusting said surface with a second phosphor powder before the second tacky pattern distributes itself over the phosphor powder adhering to the first tacky pattern, removing residual quantities of said second phosphor powder which does not adhere to said second tacky pattern, printing a third tacky pattern before the second tacky pattern has become dry, on third designated areas of said surface, dusting said surface with a third phosphor powder before the third tacky pattern distributes itself over the phosphor powders adhering to the first and second tacky patterns, removing residual quantities of said third phosphor powder which does not adhere to said third tacky pattern, and baking said surface to gasify the tacky substance of said patterns and to leave only the respective phosphors.

2. The method of preparing a tri-color fluorescent screen suitable for use in a cathode ray tube including the steps of printing a first tacky line pattern on a surface to which a screen is to be applied, dusting said surface with a first phosphor powder, removing residual quantities of said first phosphor powder which does not adhere to said first tacky line pattern, printing before the first tacky line pattern has become dry, a second tacky line pattern on said surface, dusting said surface with a second phosphor powder before the second tacky line pattern distributes itself over the phosphor powder adhering to the first tacky line pattern, removing residual quantities of said second phosphor powder which does not adhere to said second tacky line pattern, printing before the second tacky line pattern has become dry, a third tacky line pattern on said surface, dusting said surface with a third phosphor powder before the third tacky line pattern distributes itself over the phosphor powder adhering to the first and second tacky line patterns, removing residual quantities of said third phosphor powder which does not adhere to said third tacky line pattern, and baking said screen to gasify the tacky substance of said patterns.

3. The method of preparing a tri-color fluorescent screen suitable for use in a cathode ray tube including the steps of printing a first tacky pattern on designated areas of a surface on which a screen is to be applied, dusting said surface with zinc silicate powder, brushing off residual quantities of said zinc silicate powder which does not adhere to said first tacky pattern, printing a second tacky pattern before the first dusted tacky pattern has become dry on second designated areas of a surface on which a screen is to be applied, dusting said surface with zinc sulfide powder before the second tacky pattern distributes itself over the phosphor dusted, first tacky pattern, brushing off residual quantities of said zinc sulfide powder which does not adhere to said second tacky pattern before the first and second tacky line patterns become dry, printing a third tacky pattern on third designated areas of a surface on which a screen is to be applied, dusting said surface with a cadmium sulfide powder, brushing off residual quantities of said cadmium sulfide powder which do not adhere to said third tacky pattern, and the baking of said screen to gasify the tacky substance of said pattern and leaving only the respective phosphors.

4. The method of preparing a tri-color fluorescent screen suitable for use in a cathode ray tube including the steps of printing a first tacky pattern on designated areas of a surface on which a screen is to be applied, dusting said surface with a first phosphor powder, brushing off before said first pattern becomes dry, residual quantities of said first phosphor powder which does not adhere to said first tacky pattern, printing before the first phosphor dusted pattern becomes dry, a second tacky pattern on second designated areas of a surface on which a screen is to be applied, dusting said surface with a second phosphor powder before the second tacky pattern distributes itself over the first, dusted, tacky pattern, brushing off residual quantities of said second phosphor powder which does not adhere to said second tacky pattern, printing before the first and second phosphor dusted patterns become dry, a third tacky pattern on third designated areas of a surface on which a screen is to be applied, dusting before the third tacky pattern distributes itself over the phosphor dusted first and second tacky patterns, said surface with a third phosphor powder, brushing off before said dusted, tacky pattern becomes dry, residual quantities of said third phosphor powder which does not adhere to said third tacky pattern, and baking said screen to gasify the tacky substance of said pattern and leaving only the respective phosphors.

5. In the preparation of a multi color fluorescent screen suitable for use in a cathode ray tube, the steps including printing a first tacky pattern on first designated areas of said screen, dusting the printed screen with a first phosphor powder, removing residual quantities of said first phosphor powder which does not adhere to said first tacky pattern, printing before the first tacky pattern becomes dry, a second tacky pattern on second designated areas of said screen which second tacky pattern is in prescribed offset relation to said first tacky pattern, dusting the printed screen with a second phosphor powder before the second tacky pattern distributes itself over the first, dusted tacky pattern, removing residual quantities of said second phosphor powder which does not adhere to said second tacky pattern, printing a third tacky pattern on third designated areas of said screen which third tacky pattern is in prescribed offset relation to said first and second tacky patterns, the third tacky pattern being printed before the first and second dusted patterns become dry, dusting the printed screen with a third phosphor powder, and removing residual quantities of said third phosphor powder before the third tacky pattern can distribute itself over the second, dusted tacky pattern which do not adhere to said third tacky pattern.

References Cited in the file of this patent

UNITED STATES PATENTS

| | | |
|---|---|---|
| 1,966,907 | Schneider | July 17, 1934 |
| 2,030,963 | Claude | Feb. 18, 1936 |
| 2,310,863 | Leverenz | Feb. 9, 1943 |
| 2,687,360 | Michaels | Aug. 24, 1954 |
| 2,797,172 | Mears | June 25, 1957 |

FOREIGN PATENTS

| | | |
|---|---|---|
| 14,508 | Great Britain | of 1889 |